Oct. 13, 1942.　　　L. J. APPLEGATE　　　2,298,332
GRAIN REMOVING DEVICE
Filed Feb. 17, 1941
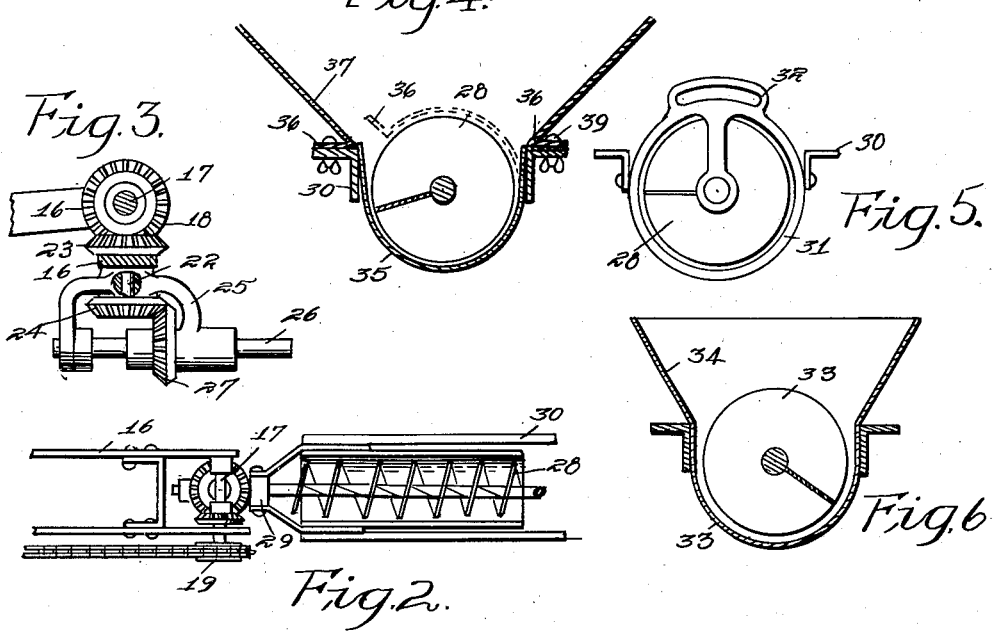
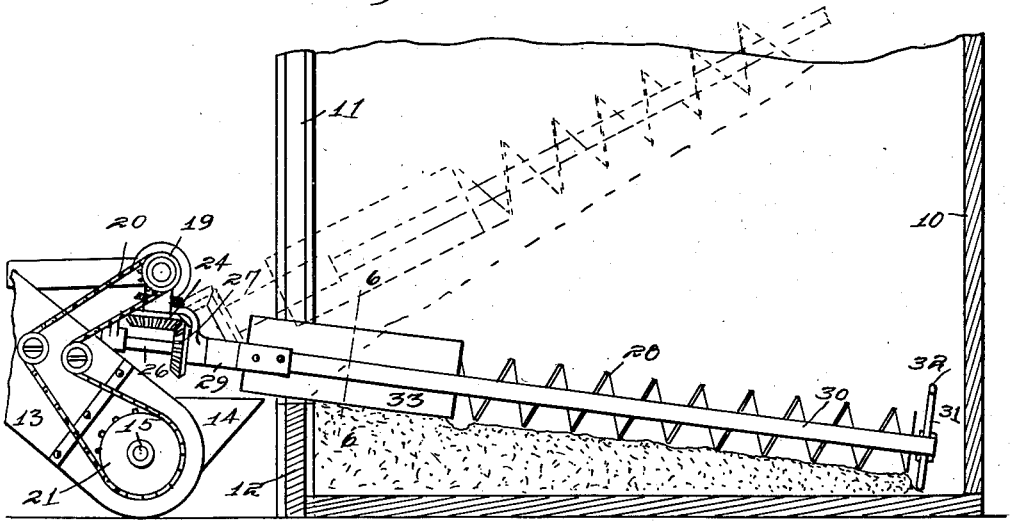
Inventor
Lester J. Applegate Patented Oct. 13, 1942

2,298,332

UNITED STATES PATENT OFFICE 2,298,332

GRAIN REMOVING DEVICE

Lester J. Applegate, Gilmore City, Iowa

Application February 17, 1941, Serial No. 379,231

2 Claims. (Cl. 198—213)

Throughout the western agricultural portions of the United States there are great numbers of bins, usually circular metal bins, in which shelled corn and other grains are stored.

When it is desired to remove such material from the bin and place it in trucks, it is the present practice to use the so-called farm grain elevator for conveying the material from the doorway of the bin up into the truck. When the door of a full grain bin is first opened at its top and then the opening gradually lowered, a considerable portion of the grain will flow by gravity into the hopper of the grain elevator. The considerable portion of the grain remaining in the bin is then usually shoveled by hand into the hopper of the farm grain elevator.

The object of my invention is to provide a grain removing device of simple, cheap and durable construction, connected with and operated by power from the farm grain elevator for conveying grain into the hopper of the grain elevator after the grain has ceased to flow through the doorway by gravity, and to automatically move downwardly as the level of the grain is lowered, and to move grain upwardly into the hopper of the grain elevator, and whereby the major portion of the grain may be removed without hand shovelling, and further to provide a grain remover of this class in which the screw conveyor while in operation may be moved laterally by the operator to thereby engage and remove grain from substantially all of the interior of a round bin.

A further object is to provide an auxiliary chute member and hopper wall readily, quickly and easily applied to and detached from the screw conveyor frame, and whereby when the device has reached such position that it will no longer engage and elevate the grain, the operator may, with a hand-operated shovel, readily and easily place the grain in the auxiliary conveyor to be carried by the conveyor across the entire width of the bin to the hopper of the grain elevator.

In the accompanying drawing—

Figure 1 shows a vertical sectional view of a part of a grain bin, and a part of a farm grain elevator, and my improved grain removing device attached thereto. The dotted line shows the level of the grain which will be assumed when the bin door is open and the grain has flowed by gravity to its maximum extent, and the dotted line position of the grain removing device is shown directly above this level;

Figure 2 shows a plan view of my grain removing device, the outer end of the screw conveyor and frame being broken away;

Figure 3 shows a front elevation of the universal joint and gearing mechanism;

Figure 4 shows a vertical transverse sectional view of the outer portion of the screw conveyor and frame, and illustrating the auxiliary chute and hopper sides in position. The dotted lines show the position of the chute when being installed;

Figure 5 shows an outer end elevation of my grain removing device; and

Figure 6 shows a sectional view on the line 6—6 of Figure 1.

The grain bins of which vast quantities are now in use, usually are made of sheet metal of round form, and have a capacity of 2,000 bushels. At one side there is a doorway, and the door is made in sections. The lower section only is shown in Fig. 1. The reference numeral 10 indicates a bin having a doorway 11 and a door section 12.

The farm grain elevator usually comprises a frame 13, having at its receiving end a hopper 14 and a conveyor not shown, driven by a shaft 15.

My improved grain removing device comprises a frame 16 designed to be fixed to a farm grain elevator frame. A transverse horizontal shaft 17 is mounted on the frame 16 and has fixed thereto a beveled gear wheel 18 and a sprocket wheel 19 which latter is driven by a sprocket chain 20 connected with a sprocket wheel 21 on the shaft 15.

Rotatably mounted in the frame 16 is a vertical shaft 22 having fixed to its upper end a beveled gear wheel 23 in mesh with the gear wheel 18, and fixed to its lower end is a beveled gear wheel 24.

Rotatably mounted on the shaft 22 is a yoke 25, with arms extended outwardly and downwardly and having a shaft 26 rotatably mounted thereon. Fixed to this shaft is a beveled gear wheel 27 in mesh with the gear 24.

A spiral conveyor 28 is fixed to the shaft 26 and is of a length to extend through the doorway of a bin, to the opposite side thereof.

Mounted on the shaft 26 is a supporting block 29, and fixed thereto are two chute frame angle bars 30 arranged at about the horizontal center of the spiral conveyor and extended to the outer end thereof.

Fixed to the outer end of the frame member 30 is a ring 31 of larger diameter than the spiral conveyor and having a handle 32.

At the delivery end of the spiral conveyor there is a chute 33 having upwardly and outwardly extended hopper sides 34. This chute is relatively short in length and extended from a point above the hopper 14 to a point a short distance into the bin, as shown in Figure 1.

The auxiliary chute, as shown in Fig. 4, is formed of a semi-cylindrical trough 35 having one radially extended flange 36 at one of the side edges, designed to overlap and be supported by the adjacent angle for the frame member 30. The other side edge rests against the opposite frame member 30 where it is held by friction.

Auxiliary hopper walls 37 are provided, and each has its lower flange 38 shaped to rest upon the adjacent frame member 30 to which it is detachably secured by bolts 39 or other fastening devices.

In practice, the farm grain elevator is moved to position close to the door opening of the bin. Then, the upper door panels are opened, thus permitting grain to flow by gravity into the hopper of the elevator. When this has proceeded until all of the door panels above the hopper have been removed and the gravity flow of the grain has stopped, then the grain removing device is swung into position within the bin, and with the spiral conveyor resting upon the surface of the grain, as shown by dotted lines in Figure 1.

When the spiral conveyor is rotated, the grain on which it rests will be advanced to the chute 33, and by it carried out of the bin and into the hopper 14. This chute 33, by being relatively short, will not support the entire spiral conveyor upon the top surface of the grain. The angle bars 30 perform several important functions. First, they support the ring 31 at the outer end of the spiral conveyor and thereby prevent the spiral conveyor from rubbing against the floor of a bin after most of the grain has been removed. Further, and because they have outwardly extended flanges at about the horizontal center of the spiral conveyor, they rest upon the grain and hold the spiral conveyor at just the right depth in the grain for most efficiently moving the grain toward the delivery spout, and finally the angle bars serve as supports for the auxiliary chute and hopper sides.

In practice, and without any aid from the operator, the grain removing device will move grain into the short chute and the grain remover will descend by gravity during such removal of the grain, to the position shown in Fig. 1, and when in this position the supporting ring 31 will rest upon the bin floor and prevent the spiral conveyor from touching the floor.

When this occurs, the operator enters the bin and grasps the handle 32 and moves the spiral conveyor laterally, first to one side and then to the other, and in this manner all of the grain over the entire floor area of the bin is removed except such grain as is below the spiral conveyor, as shown in Fig. 1. When this level has been reached, the operator applies the chute 35 and the hopper walls 37. When this has been done the remaining grain is shoveled by the operator into the chute and the chute is moved laterally as the shovelling progresses and carries the grain to the farm elevator hopper.

Thus, all of the grain in a bin may be quickly removed with a minimum of hand labor.

When grain is in piles, not in bins, my device is used in substantially the same manner, and materials other than grain may be handled.

The short chute 33 in combination with the long spiral conveyor performs several advantageous results. If the spiral conveyor were placed in the position shown by dotted lines in Fig. 1, and without the chute 33, then during the rotation of the conveyor it would move downwardly to the bottom of the bin before the grain was removed; but with the chute, the spiral conveyor is held at the top surface of the grain, and the conveyor lowers only as fast as the top level of the grain is lowered. Further, when the device is in the position shown in Fig. 1 by solid lines, the spiral conveyor without the chute would not elevate the grain into the hopper of the farm grain elevator. There must be a chute coacting with the spiral conveyor for grain elevating purposes.

I claim as my invention:

1. A device for removing grain from storage bins, comprising a supporting frame, a conveyor frame pivotally connected to the supporting frame for universal movement and including two parallel bars having outwardly extended flanges and an outer end member for supporting the conveyor frame upon a floor, a screw conveyor rotatably mounted in the conveyor frame between said bars and having its lower portion extended below said bars and its outer end portion above the lower portion of said outer end member, means for rotating the screw conveyor, a chute member fixed to the conveyor frame and surrounding the lower portion of the conveyor and open at its top and being extended from the inner end portion of the conveyor towards the outer end of the conveyor and being of a length substantially less than that of the conveyor portion beyond the chute, and a detachable chute member substantially semi-circular in cross section inserted between said bars and the chute and engaging and supported by said bars and extended from said first mentioned chute to the outer end portion of the conveyor.

2. A device for removing grain from storage bins, comprising a supporting frame, a conveyor frame pivotally connected to the supporting frame for universal movement and including two parallel bars having outwardly extended flanges and an outer end member for supporting the conveyor frame upon a floor, a screw conveyor rotatably mounted in the conveyor frame between said bars and having its lower portion extended below said bars and its outer end portion above the lower portion of said outer end member, and means for rotating the screw conveyor, a chute member fixed to the conveyor frame and surrounding the lower portion of the conveyor and open at its top and being extended from the inner end portion of the conveyor towards the outer end of the conveyor and being of a length substantially less than that of the conveyor portion beyond the chute.

LESTER J. APPLEGATE.